No. 698,114. Patented Apr. 22, 1902.
F. HERLT.
MACHINE FOR TEACHING TYPE WRITING.
(Application filed July 10, 1901.)
(No Model.) 6 Sheets—Sheet 1.
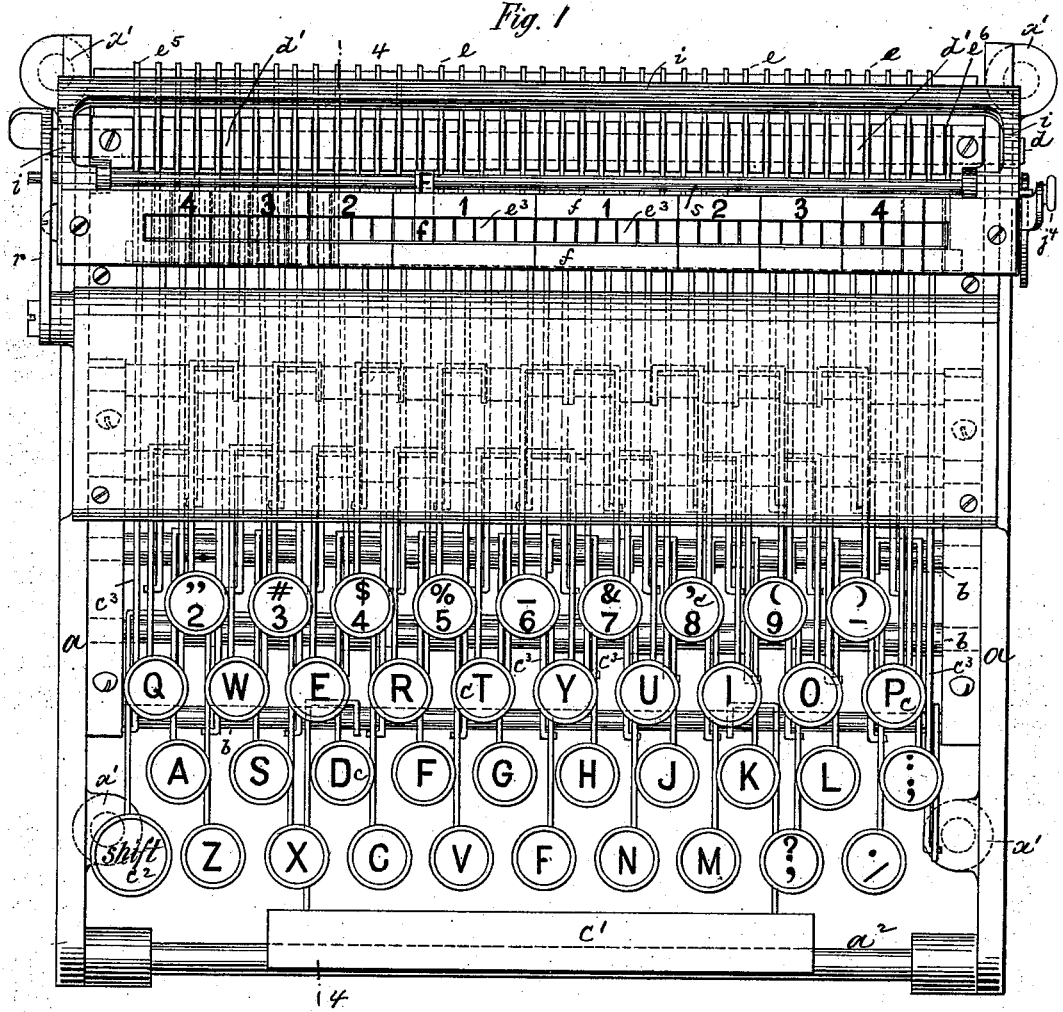
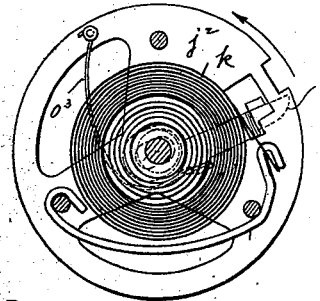
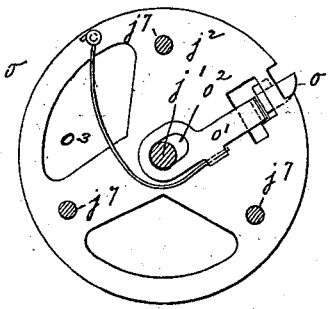
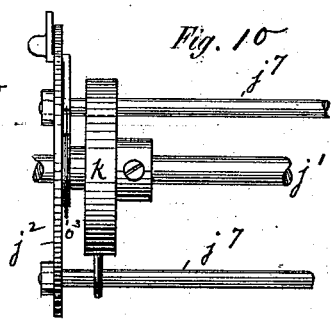
Witnesses: Inventor,
William Schulz Frank Herlt
Eugene Guérin by Roeder & Briesen Att'ys.

No. 698,114. Patented Apr. 22, 1902.
F. HERLT.
MACHINE FOR TEACHING TYPE WRITING.
(Application filed July 10, 1901.)
(No Model.) 6 Sheets—Sheet 2.
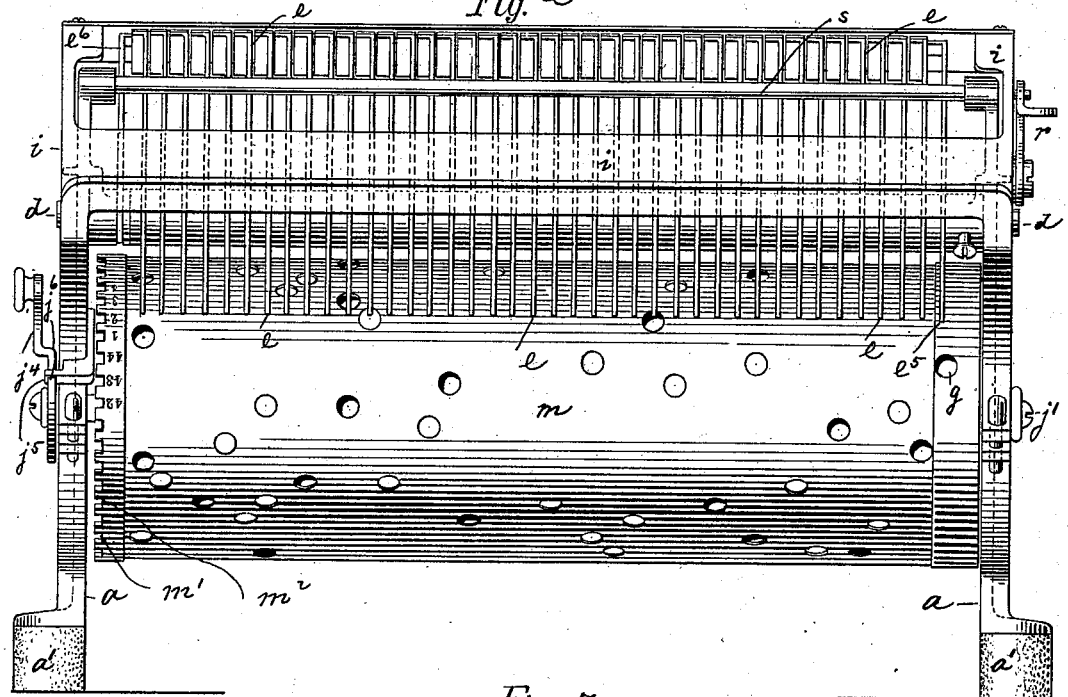
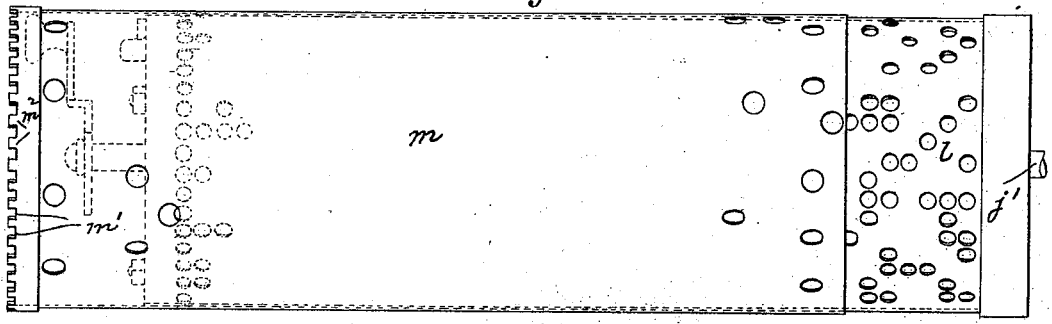
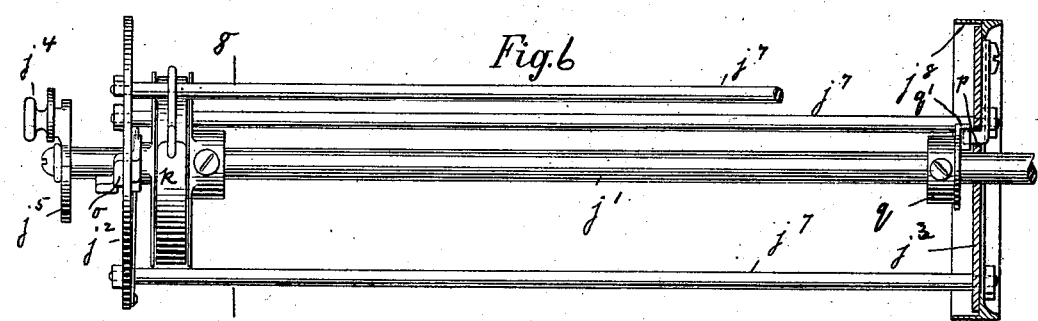
Witnesses
William Schulz.
Eugene Guérin
Inventor
Frank Herlt
by Roeder & Briesen Attys.

No. 698,114. Patented Apr. 22, 1902.
F. HERLT.
MACHINE FOR TEACHING TYPE WRITING.
(Application filed July 10, 1901.)

(No Model.) 6 Sheets—Sheet 3.

Witnesses:
William Schulz
Eugene Guerin

Inventor,
Frank Herlt
by Roeder & Briesen Att'ys.

No. 698,114.  
Patented Apr. 22, 1902.
F. HERLT.  
MACHINE FOR TEACHING TYPE WRITING.  
(Application filed July 10, 1901.)
(No Model.)  
6 Sheets—Sheet 4.
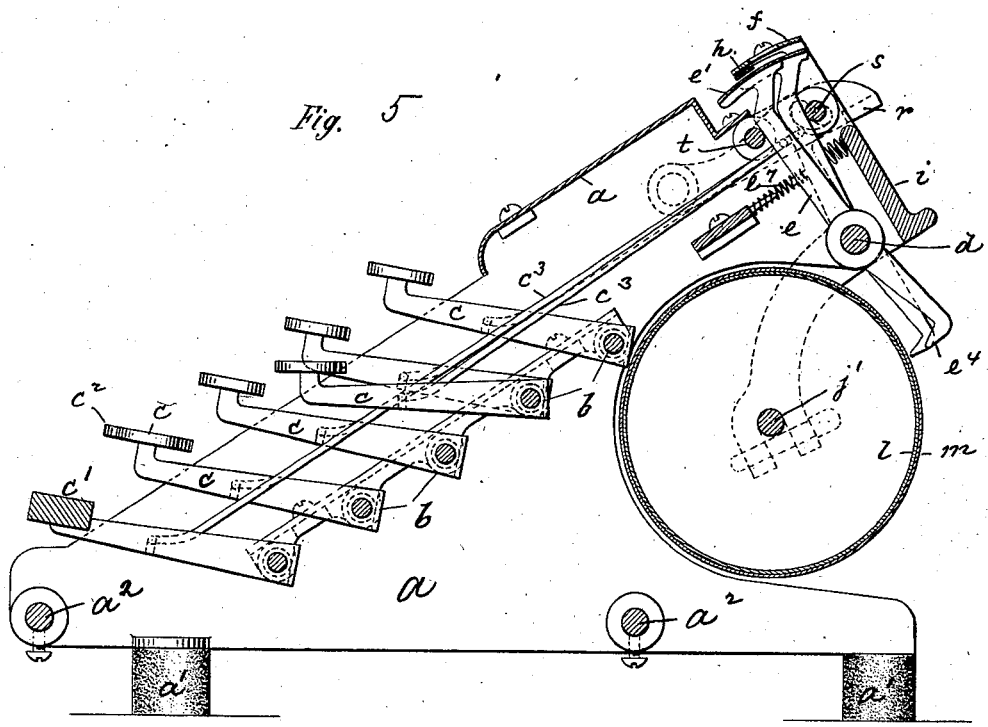
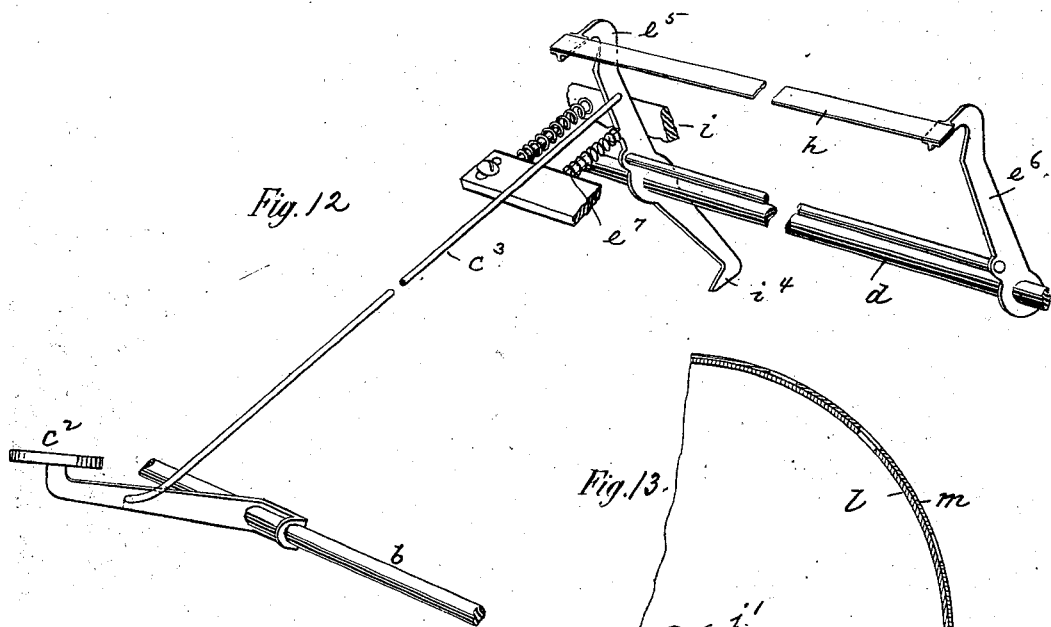
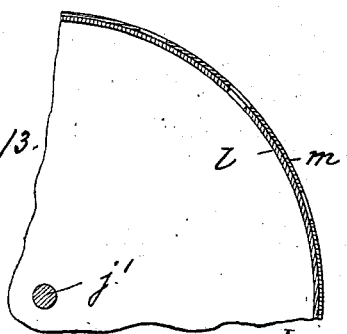
Witnesses:  
William Schulz  
Eugene Guerin
Inventor:  
Frank Herlt  
by Roeder & Briesen Att'ys.

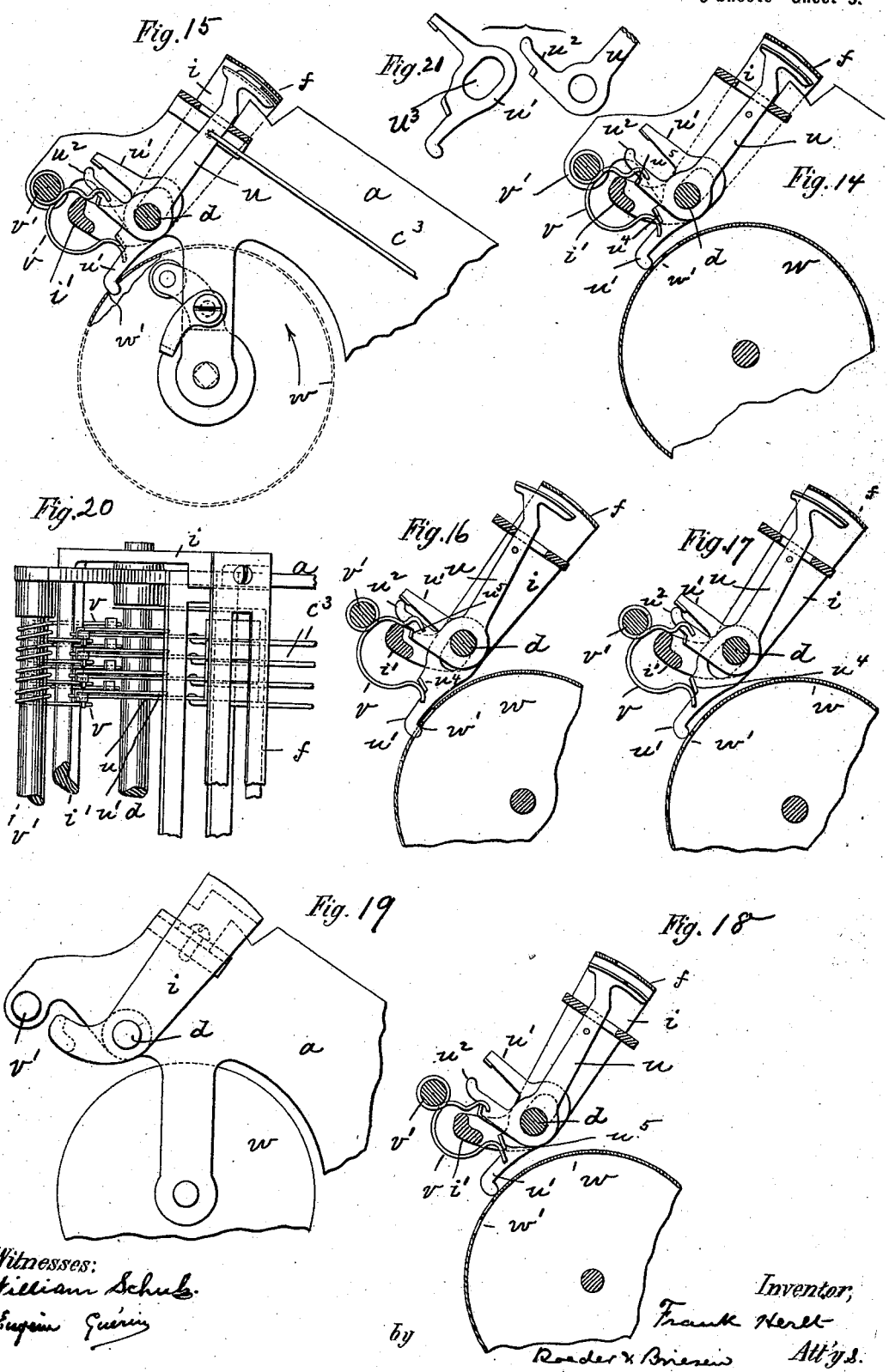

No. 698,114.  
F. HERLT.  
MACHINE FOR TEACHING TYPE WRITING.  
(Application filed July 10, 1901.)  
Patented Apr. 22, 1902.

(No Model.)  
6 Sheets—Sheet 6.

Witnesses:  
William Schulz.  
Eugene Guerin.

Inventor,  
Frank Herlt  
by Roeder & Briesen Att'ys.

UNITED STATES PATENT OFFICE.

FRANK HERLT, OF NEW YORK, N. Y.

MACHINE FOR TEACHING TYPE-WRITING.

SPECIFICATION forming part of Letters Patent No. 698,114, dated April 22, 1902.

Application filed July 10, 1901. Serial No. 67,706. (No model.)

*To all whom it may concern:*

Be it known that I, FRANK HERLT, a citizen of the United States, and a resident of New York city, county and State of New York, have invented certain new and useful Improvements in Machines for Teaching Type-Writing, of which the following is a specification.

This invention relates to an improved machine by means of which scholars may learn the art of spelling and type-writing in a novel manner and without apparent mental effort.

The invention consists of the various features of construction more fully pointed out in the claims.

Figure 3:
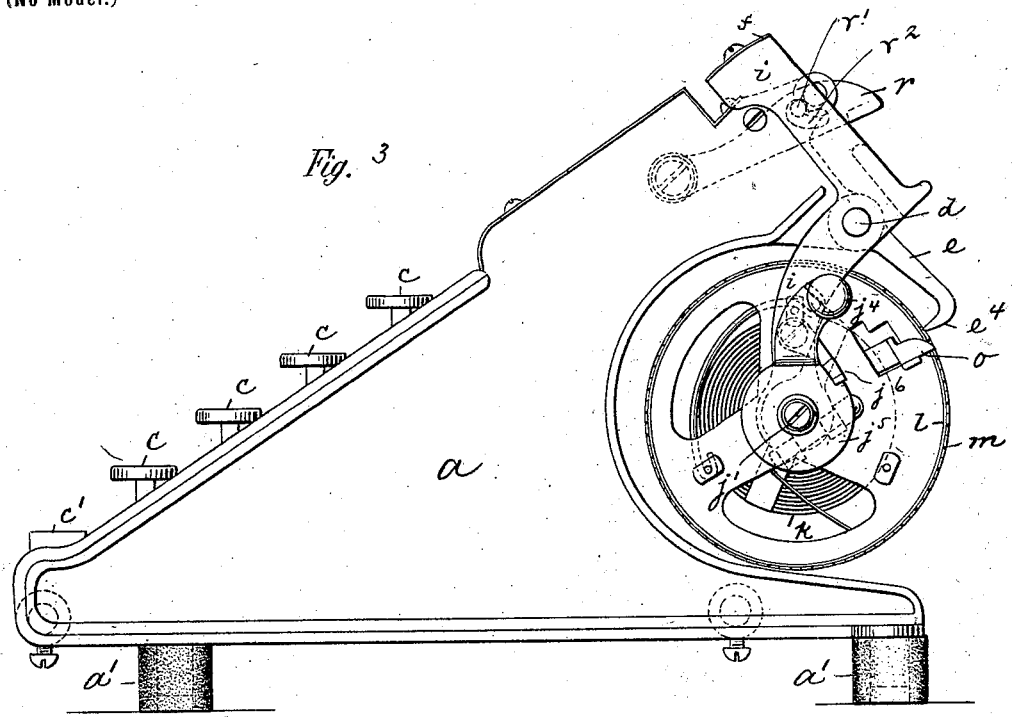
Figure 4:
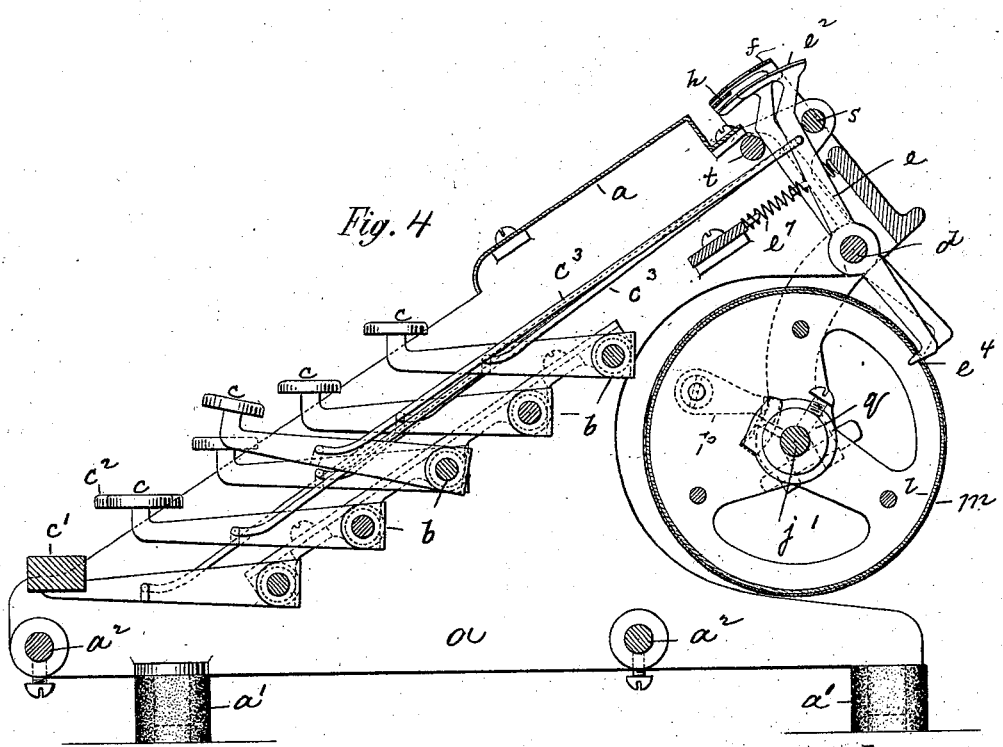
Figure 22:
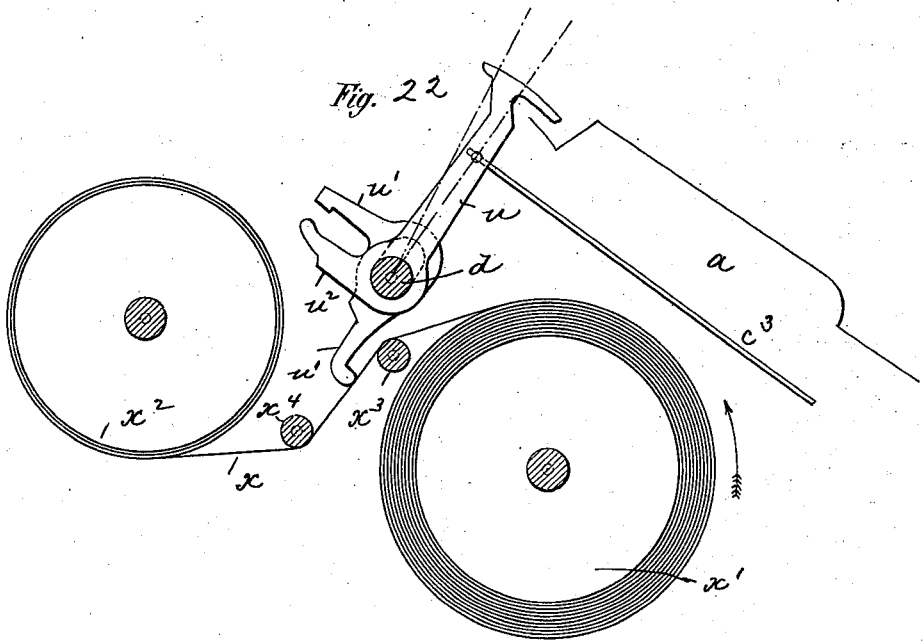

In the accompanying drawings, Figure 1 is a plan of my improved machine for teaching type-writing; Fig. 2, a rear view thereof; Fig. 3, a side elevation showing the right-hand side of the machine; Fig. 4, a vertical transverse section on line 4 4, Fig. 1; Fig. 5, a similar section showing the parts in the different positions; Fig. 6, the side view, partly in section, of the reel; Fig. 7, a side view of the reel with the perforated sign-sheet in position; Fig. 8, a cross-section on line 8 8, Fig. 6; Fig. 9, a similar section with the spring removed; Fig. 10, the side view of one end of the reel; Fig. 11, a detailed face view of the signs on a pair of adjoining sign-carriers; Fig. 12, a perspective view of the shutter and its operating mechanism; Fig. 13, an enlarged section through portion of two adjoining sign-sheets; Fig. 14, a sectional side elevation of a modification of the sign-carrier. Figs. 15, 16, 17, and 18 are similar views showing the sign-carrier in consecutive positions; Fig. 19, a side view of the oscillating frame; Fig. 20, a plan of a series of the sign-carriers; Fig. 21, a detailed view of the parts $u$ and $u'$; Fig. 22, an edge view of a modification of the sign-sheet, and Fig. 23 a plan thereof.

The frame of the machine is composed of two side plates $a$, mounted upon feet $a'$ and connected by braces $a^2$. The plates $a$ support four (more or less) rods $b$, arranged in a parallel direction above and back of one another and constituting the fulcrums for the keys $c$. The drawings show the keyboard corresponding to a single-shift type-writing machine and having the usual space-bar $c'$ and shift-key $c^2$. Each key is connected by a draw-rod $c^3$ with a sign-carrier $e$, made either in one piece, as in Figs. 1 to 13, or in two pieces, as in Figs. 14 to 21. The sign-carriers are mounted upon a common shaft $d$ and are spaced by intervening collars $d'$. Each sign-carrier carries at its forward end or head two characters or signs $e^2$ and $e'$, corresponding to the upper and lower case of a single-shift typewriter, which characters or signs are separated by an intermediate blank space $e^3$. At its lower end each sign-carrier terminates in a hook or nose $e^4$, adapted to engage or hold in a movable sign-sheet, which is hereinbelow more fully described. When a hole in such signsheet arrives in alinement with a hook $e^4$, the latter is drawn down by means of the spring $e^7$, so as to raise the head of the lever $e$, and consequently swing both its signs $e'$ $e^2$ upward. In the normal position of the machine the central or blank spaces $e^3$ of the sign-carrier heads are all exposed through the central long or narrow openings of a frame or shield $f$, Fig. 1, the upper and lower sides of which cover up the upper and lower signs $e'$ and $e^2$, respectively. Thus upon the swinging of a sign-carrier in the manner described the lower sign $e'$ will be exposed through the center of shield $f$, the blank space $e^3$ will be concealed by the upper side of the frame $f$, and the upper sign $e'$ will be exposed above the frame. The lever $e^5$ of the shift-key $c^2$ engages the initial or starting hole $g$ of the cylindrical sign-sheet. As this carrier is depressed and the sign-sheet liberated the latter is rotated, in the manner hereinafter described, until it is arrested by the dropping of one of the hooks $e^4$ into the perforation of the sign-sheet which arrives first beneath any one carrier. This will throw the head of such carrier up and expose its lower sign $e'$ to the scholar. This lower sign is the one to be read, while the upper sign $e^2$ is attached to the carrier for the purpose of instructing the scholar, which two signs go together. The movement of the carrier $e$ will by rod $c^3$ carry the corresponding key up simultaneously with the uncovering of the sign $e'$. This raised key is thus readily distinguishable from the other keys by sight and touch, and by next depressing it the carrier $e$ is withdrawn and the sign-sheet liberated to rotate until its next perforation is engaged by one of the carriers $e$. In this way it will be seen by suitably arranging the perforations of the sign-sheet any word or sentence will be readily spelled out without mental effort, the operator merely depressing the keys that are successively raised in an automatic manner. When the shift-lever $e^5$ again falls into the perforation $g$, one rotation of the sign-sheet is completed and the desired phrase or word has been spelled. The dropping of the carrier $e^5$ into the perforation $g$ will cause a shutter $h$, which is attached to such carrier and to a lever $e^6$, mounted upon shaft $d$, Fig. 12, to be drawn down, and to thus close the opening of shield $f$ as the signal that the sign-sheet is to be reset or rewound.

The sign-sheet may be made in the form of a perforated cylinder or of two telescoping perforated cylinders, which may be adjusted in relation to one another so as to bring different sets of holes into alinement. The cylinders are removably secured to a common supporting-reel, so that by supplying new cylinders an infinite number of combinations may be readily attained. With a single sign-sheet each sheet of course spells out but one single combination of words, while with two telescoping sign-sheets, which is the construction shown in the drawings, different combinations may be obtained by changing the relative position of such sign-sheets.

The construction of the double sign-sheet and its supporting-reel is as follows:

Upon the ends of shaft $d$ is hung an oscillating frame $i$, Fig. 3, the forward end of which carries the shield $f$, while the downwardly-projecting ends form the bearing for the shaft $j'$ of the reel, the heads $j^2 j^3$ of which are revolubly carried upon such shaft. The shaft $j'$, Fig. 6, is provided with a handle $j^4$, having a notched disk $j^5$, which is engaged by detent $j^6$, pivoted to frame $i$. To the shaft $j'$ is attached one end of a helical spring $k$, the other end of which is connected to one of a set of bars $j^7$, connecting the revoluble heads $j^2 j^3$. Thus by turning the handle $j^4$ the reel is wound up. The head $j^3$ carries a stop $p$, coöperating with a stop $q'$ on a collar $q$, fast on shaft $j'$. The stops $p$ and $q'$ limit the winding-up movement of the handle $j^4$ and the running-off movement of the reel to one complete rotation.

The two sign-sheets are made in the form of two perforated cylinders $l$ and $m$, which are of a diameter to snugly fit into one another and which have a number of perforations so placed that different sets of perforations may be brought into radial alinement by giving one of the cylinders a slight axial turn. Fig. 7 shows the upper cylinder partly drawn off, so as to expose the lower cylinder. Those perforations of the two cylinders which are brought into alinement will form openings for admitting the hooks $e^4$ of the sign-carriers $e$, while those perforations which are out of alinement will of course not form any openings and will not actuate the sign-carriers. The inner cylinder $l$ fits at one end under the flange $j^8$ of head $j^3$, (that has a starting-hole $g$, hereinabove referred to,) while its other end passes over the head $j^2$. The outer cylinder $m$ abuts at one end against the flange $j^8$, while its other end projects some distance over the head $j^2$. This projecting end of cylinder $m$ is provided with a series of notches $m'$ between projections $m^2$, which notches correspond in number to the number of combinations to which the cylinders may be set. The notches $m'$ are adapted to be engaged by a sliding hand-operated dog or pawl $o$, Fig. 9, the shank $o'$ of which is provided with an elongated slot $o^2$, that embraces shaft $j'$, and is influenced by a spring $o^3$. When the dog is swung forward, it will rotate the outer cylinder $m$ for the distance of one notch upon the inner cylinder $l$. When the dog is retracted by spring $o'$, it will clear the projection $m^2$, owing to the inward movement permitted by the slot $o^2$, and will enter the next slot. When the outer cylinder has been thus set to the position desired, the dog will constitute a detent which locks the outer cylinder in relation to the inner cylinder.

When the rear end of the frame $i$ is raised, Fig. 4, the sign-cylinder carried thereby is also raised and is brought into such an engagement with the sign-carriers $e$ that by the operation of the keys and the key movement of the sign-sheet the successive signs $e'$ are exposed and the successive keys are raised to form the word or reading desired, all in the manner hereinabove described. In this way the next succeeding character is displayed to the operator both by the sign and by the raised key, and by depressing the successively-raised keys the word or combination of the perforated sign-sheets are spelled off on the machine. If it is desired to operate the machine similar to an ordinary type-writer, so as to successively expose the signs $e'$, but not to raise the keys, the frame $i$ is swung down at its lower end, Fig. 5, to cause the reel and sign-cylinders to descend. The frame $i$ is locked in both of its working positions by means of a catch $r$. This catch or pawl is pivoted to the frame $a$ and is provided with an angular slot $r^2$. This slot is adapted to engage a pin $r'$ of frame $i$. When the cylinder $m$ is to be raised, the frame $i$ is tilted upon fulcrum $d$, so that its upper end swings forward, in which position it is maintained by the engagement of the pin $r'$ with the upright part of slot $r^2$, Fig. 3. If the cylinder $m$ is to be lowered, the pawl $r$ is swung upward, so that the pin $r'$ will be received by the horizontal part of slot $r^2$. When the frame is swung down in the manner described, it will carry the shield $f$ up. At the same time the forward ends of the sign-carriers (the rear ends being relieved from the pressure of the cylinder) are also carried up by means of the springs $e^7$ until they strike against a rear stop-bar $s$, that extends across the entire machine. The carriers $e$ on being thus swung up will by rods $e^3$ pull up the forward ends of the keys $c$, and thus raise the entire keyboard. When the keys are now operated, they will draw the carriers $e$ down until they abut against the front stop-bar $t$. The lower sign $e'$ will now be displayed below the shield $f$, while the upper sign $e^2$ will be displayed within the opening of the shield. The shutter $h$ when drawn down conceals the lower signs $e'$, so that the upper signs $e^2$ only are to be read.

It will be seen that when the frame $i$ is swung into position, as shown by Fig. 5, the movement of the carriers $e$ is by the rear stop $s$ limited to such an extent that the hooks $e^4$ cannot swing down and into engagement with the sign-sheet. This sheet in the position of the parts indicated is not rotated, by reason of its spring not being wound up. In this way the manipulation of a key will cause the display of the corresponding sign at the shield $f$, but not an automatic display of the succeeding signs or a raising of the succeeding key, as is the case when the sign-sheet is in action.

It is evident that the machine may be used not only for teaching type-writing, but also for spelling, because by successively depressing the keys the words, &c., corresponding to such keys will be spelled out at the shield $f$. It is also evident that the type-carriers $e$ in lieu of being operated by perforations in the sign-sheet may be operated by protuberances on such sheet, which protuberances obviously constitute a full equivalent for the perforations. The sign-sheets may also be made in the form of notched or toothed disks or rings, one disk being supplied to each sign-carrier. These disks may be shifted to assume different relative positions, so as to form different combinations.

In Figs. 15 to 21 is shown the modified construction of the sign-carrier. Here the carrier is made sectional, being composed of an upper arm $u$, carrying the signs, and of a lower arm $u'$, that engages and is actuated by the sign-sheet. The upper arm $u$ is provided with a tappet $u^2$, and the lower arm is made in the form of a bell-crank, one arm of which is actuated by the perforated sign-sheet, while the other arm is adapted to engage the tappet. Both arms $u$ and $u'$ are mounted side by side upon the shaft $d$, the bell-crank $u'$ having an elongated slot $u^3$ for permitting the play of the bell-crank upon the shaft. The shaft $d$ also carries the oscillating frame $i$, hereinabove described. This frame $i$ is provided with a cross-bar $i'$, which when the frame is tilted upward at its lower end is adapted to lift the upper end of a coiled spring $v$ off the tappet $u^2$, and thus cause the sign-carrier and the key connected thereto to drop into their lowermost position. This operation takes place because when the spring $v$ is raised off the tappet $u^2$ to release the sign-carrier $u^2$ $u$ the weight of the arm $u$ and of key $c$, connected thereto, will cause the sign-carrier to drop by gravity. The spring $v$ is coiled around the shaft $v'$ and engages with its lower end a projection $u^4$ of the bell-crank $u'$. The operation is as follows: Before the bell-crank enters the hole in the sign-sheet, Fig. 14, the arm $u$ is relieved from spring-pressure and has dropped. The bell-crank $u'$ is in its uppermost position. Upon the rotation of the sign-cylinder $w$ the light pressure of spring $v$ will throw the bell-crank into the perforation $w'$ as soon as such perforation arrives in alinement with the bell-crank, Fig. 15. Upon the further rotation of the sign-cylinder, Fig. 16, the latter will take the bell-crank along against the strong action of spring $v$ and cause it to engage the tappet $u^2$. In this way the sign-carrying head of arm $u$ will be thrown up to display the sign and to also throw up the corresponding key $c$ in the manner hereinabove described. If now the raised key is depressed, Fig. 17, the arm $u$ is swung downward and its tappet will tilt the bell-crank and withdraw the same from perforation $w'$. The spring $v$ will now slide the bell-crank upward and back into the position shown in Fig. 14. If the frame $i$ is thrown downward, (with its lower end corresponding to the position shown in Fig. 5,) the cross-bar $i'$ will clear the spring $v$, Fig. 18, and the latter will be free to bear upon a projection $u^5$ of tappet $u^2$ and throw the upper end of the arm $u$ and the key connected thereto upward. The cylinder $w$ being not rotated, the bell-cranks are entirely out of action, and a pressure upon the keys will simply cause a display of the signs upon the corresponding sign-carriers.

Figure 23:
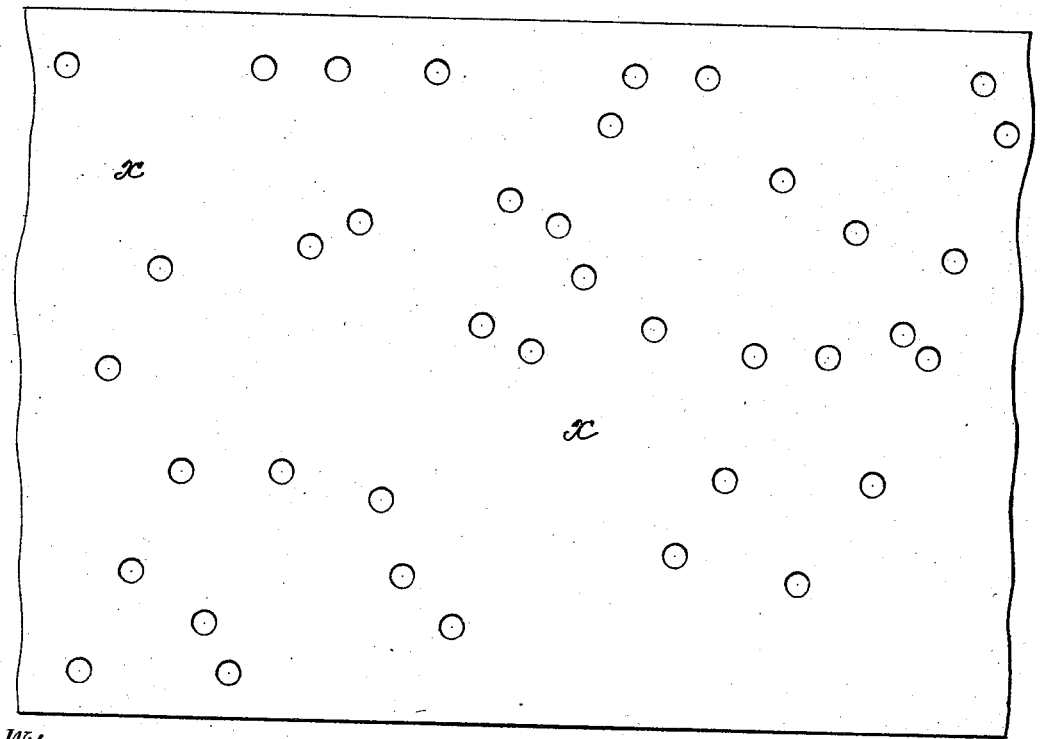

In Figs. 22 and 23 I have shown a perforated sign-band $x$ to be used in lieu of the perforated sign-cylinder. This band is wound from delivery-reel $x'$ upon the receiving-reel $x^2$ and will actuate the bell-crank or the sign-carrier while passing between a pair of tension-rollers $x^3$ and $x^4$.

As will be seen from above description, the machine is not a type-writing machine, as imprints cannot be made by it upon paper; but the machine is designed to teach the art of type-writing as far as the correct fingering of words is concerned. By means of the successively automatically raised keys the student will memorize the arrangement of the keyboard quickly, and the machine will not only impress upon him the correct form of words by means of the successively-appearing signs, but will also teach the correct fingering for such words by the successively-raised keys. Such writing speed as has been acquired upon this machine may be utilized upon any regular type-writing machine having a similar keyboard arrangement.

What I claim is—

1. In a machine for teaching type-writing, the combination of a series of keys with a series of sign-carriers operatively connected thereto, and with a sign-sheet adapted to actuate such carriers, substantially as specified.

2. In a machine for teaching type-writing, the combination of a series of keys with a series of sign-carriers operatively connected thereto, and with a sign-sheet adapted to tilt the sign-carriers and simultaneously raise the keys, substantially as specified.

3. In a machine for teaching type-writing the combination of a series of keys with sign-carriers operatively connected thereto, a movable perforated sign-sheet adapted to oscillate said carriers, and signs displayed upon the carriers, substantially as specified.

4. In a machine for teaching type-writing the combination of a series of keys with sign-carriers operatively connected thereto, a movable perforated sign-sheet adapted to actuate such carriers, signs upon the carriers, and a shield that partly conceals such signs, substantially as specified.

5. In a machine for teaching type-writing the combination of a series of keys with a series of sign-carriers operatively connected thereto, a sign-sheet adapted to actuate the same, and with means for feeding such sign-sheet, substantially as specified.

6. In a machine for teaching type-writing, the combination of a series of sign-carriers with a sign-sheet adapted to actuate the same, means of feeding the sign-sheet, and a shield that partly conceals the signs, substantially as specified.

7. In a machine for teaching type-writing the combination of a series of sign-carriers with a sign-sheet adapted to actuate the same, means for feeding the sign-sheet, a shield adapted to partly conceal the signs, and a shutter for covering up the signs within or beyond the shield, substantially as specified.

8. In a machine for teaching type-writing, the combination of a cylindrical perforated sign-sheet with a series of sign-carriers adapted to be actuated by said sheet and with keys operatively connected to said sign-carriers, substantially as specified.

9. In a machine for teaching type-writing, the combination of a series of sign-carriers with keys operatively connected thereto and a cylindrical rotatable sign-sheet adapted to actuate the sign-carriers, substantially as specified.

10. In a machine for teaching type-writing the combination of a series of key-operated sign-carriers with an oscillating frame and a cylindrical sign-sheet carried by such frame and adapted to actuate the sign-carriers, substantially as specified.

11. In a machine for teaching type-writing, the combination of a series of key-operated sign-carriers with a reel, means for rotating said reel, and a cylindrical sign-sheet removably secured to said reel, substantially as specified.

12. In a machine for teaching type-writing, the combination of a series of key-operated sign-carriers with a reel, means for rotating said reel, a cylindrical sign-sheet secured to said reel, and a stop for limiting the rotation of said reel, substantially as specified.

13. In a machine for teaching type-writing, the combination of a series of sign-carriers with a pair of telescope perforated sign-sheets and means for changing the relative positions of said sheets, substantially as specified.

14. In a machine for teaching type-writing, the combination of a series of key-operated sign-carriers with a reel, a pair of telescope cylindrical sign-sheets mounted upon said reel, means for changing the relative position of the sign-sheets, means for rotating the reel and means for limiting said rotation, substantially as specified.

15. In a machine for teaching type-writing, the combination of a pair of perforated telescoped sign-sheets with a series of sign-carriers adapted to be actuated thereby so as to raise or lower the signs on said carriers, substantially as specified.

16. In a machine for teaching type-writing, the combination of a series of key-operated sign-carriers with an oscillating frame, a rotatable sign-sheet supported thereby, and a stop-bar for limiting the movement of the sign-carriers when said sign-carriers are raised, substantially as specified.

Signed by me at New York city, county and State of New York, this 9th day of July, 1901.

FRANK HERLT.

Witnesses:
F. V. BRIESEN,
WILLIAM SCHULZ.